United States Patent
Lee et al.

(10) Patent No.: US 12,393,018 B2
(45) Date of Patent: Aug. 19, 2025

(54) DISPLAY APPARATUS AND CONTROL METHOD THEREOF

(71) Applicant: SAMSUNG ELECTRONICS CO., LTD., Suwon-si (KR)

(72) Inventors: Yongjune Lee, Suwon-si (KR); Jaehoo Park, Suwon-si (KR); Sangkyun Im, Suwon-si (KR); Kilsoo Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/652,264

(22) Filed: May 1, 2024

(65) Prior Publication Data
US 2024/0280801 A1  Aug. 22, 2024

Related U.S. Application Data

(63) Continuation of application No. PCT/KR2024/000493, filed on Jan. 10, 2024.

(30) Foreign Application Priority Data

Feb. 8, 2023  (KR) ........................ 10-2023-0016976

(51) Int. Cl.
*G02B 26/02* (2006.01)
*G02B 26/08* (2006.01)
(Continued)

(52) U.S. Cl.
CPC ........... *G02B 26/02* (2013.01); *G09G 3/2074* (2013.01); *G09G 2300/0842* (2013.01)

(58) Field of Classification Search
CPC ....... G02B 26/02; G02B 26/08; G09G 3/2074
See application file for complete search history.

(56) References Cited

U.S. PATENT DOCUMENTS 8,773,614 B2  7/2014  Han et al.
9,153,165 B2 *  10/2015  Zhang ................... H05B 33/12
(Continued)

FOREIGN PATENT DOCUMENTS

EP  2 461 208 A1  6/2012
JP  2011-59589 A  3/2011
(Continued)

OTHER PUBLICATIONS

International Search Report (PCT/ISA/210) issued on Mar. 29, 2024 by the International Searching Authority in International Patent Application No. PCT/KR2024/000493.
(Continued)

*Primary Examiner* — Sardis F Azongha
(74) *Attorney, Agent, or Firm* — Sughrue Mion, PLLC

(57) ABSTRACT

A display apparatus includes a transparent display panel including pixel devices; a first optical shutter part provided at a first side of the pixel devices and a second optical shutter part provided at a second side of the pixel devices opposite from the first side; and at least one processor configured to: control the transparent display panel to alternately display a first image and a second image at a pre-set output frequency, control the first optical shutter part and the second optical shutter part to be in an open state or a closed state based on the pre-set output frequency, control the second optical shutter part to be in the closed state while the first optical shutter part is in the open state, and control the second optical shutter part to be in the open state while the first optical shutter part is in the closed state.

18 Claims, 17 Drawing Sheets

(51) Int. Cl.
  *G02F 1/1335* (2006.01)
  *G02F 1/1343* (2006.01)
  *G09G 3/20* (2006.01)

(56) References Cited

U.S. PATENT DOCUMENTS

| | | | |
|---|---|---|---|
| 10,339,845 | B2 | 7/2019 | Choi et al. |
| 2011/0063490 | A1 | 3/2011 | Ogita |
| 2016/0161650 | A1* | 6/2016 | Taraschi ............... G02B 26/023 |
| | | | 359/230 |
| 2016/0178972 | A1* | 6/2016 | Lo ......................... H10D 86/481 |
| | | | 257/71 |
| 2017/0178588 | A1 | 6/2017 | Choi |
| 2018/0217429 | A1 | 8/2018 | Busch |

FOREIGN PATENT DOCUMENTS

| | | |
|---|---|---|
| JP | 2013-41411 A | 2/2013 |
| KR | 10-1623017 B1 | 5/2016 |
| KR | 10-1718241 B1 | 3/2017 |
| KR | 10-2017-0073021 A | 6/2017 |
| KR | 10-1833969 B1 | 4/2018 |
| KR | 10-1984268 B1 | 9/2019 |
| KR | 10-2025408 B1 | 9/2019 |
| KR | 10-2284357 B1 | 8/2021 |
| KR | 10-2022-0070413 A | 5/2022 |

OTHER PUBLICATIONS

Written Opinion (PCT/ISA/237) issued on Mar. 29, 2024 by the International Searching Authority in International Patent Application No. PCT/KR2024/000493.

* cited by examiner

DISPLAY APPARATUS AND CONTROL METHOD THEREOF

CROSS-REFERENCE TO RELATED APPLICATIONS

This application is a by-pass continuation of International Application No. PCT/KR2024/000493, filed on Jan. 10, 2024, which is based on and claims priority to Korean Patent Application No. 10-2023-0016976, filed on Feb. 8, 2023, in the Korean Intellectual Property Office, the disclosures of which are incorporated by reference herein in their entireties.

BACKGROUND

1. Field

The disclosure relates to a display apparatus and a control method thereof, and more particularly, to a display apparatus that displays an image with a plurality of display directions using a plurality of optical shutters and a control method thereof.

2. Description of Related Art

Display apparatuses of various types are being used in various fields with developments in electronic technology. Specifically, recently, discussions in research for next-generation display apparatuses such as a transparent display apparatus are fast underway.

A transparent display apparatus refers to a display apparatus that includes a transparent display panel in which a display that displays an image has transparent properties. In related art, display panels using opaque semiconductor compounds such as silicon (Si) and gallium arsenide (GaAs) have been manufactured, but with demands for various display services that cannot be implemented using the display panels of the related art, the transparent display apparatus has been developed to meet such demands, and research and development of the above is actively in progress.

The transparent display apparatuses of the related art have been limited in displaying an image at a back surface thereof in cases where the image is displayed at a front surface thereof, and even if the image was displayed at the back surface thereof, the image displayed at the back surface thereof could only be displayed in an image symmetrical with the front surface thereof according to a principle of illumination of the transparent display.

To overcome the above, a technique of displaying an image at the front surface thereof and the back surface thereof, respectively, by providing a plurality of light emitting layers corresponding to the respective front and back surfaces has been developed, but there has been the problem of the above being limited economically for utilizing the plurality of light emitting layers and commercialization being difficult.

SUMMARY

According to an aspect of the disclosure, a display apparatus includes: a transparent display panel including a plurality of pixel devices; a first optical shutter part provided at a first side of the plurality of pixel devices and a second optical shutter part provided at a second side of the plurality of pixel devices opposite from the first side; and at least one processor configured to: control the transparent display panel to alternately display a first image and a second image at a pre-set output frequency, control the first optical shutter part and the second optical shutter part to be in an open state or a closed state based on the pre-set output frequency, control the second optical shutter part to be in the closed state while the first optical shutter part is in the open state, and control the second optical shutter part to be in the open state while the first optical shutter part is in the closed state.

The at least one processor may be further configured to control the first optical shutter part and the second optical shutter part to be open or closed at a frequency two times greater than the pre-set output frequency.

The display apparatus may further include: a plurality of first optical shutter parts including the first optical shutter part; and a plurality of second optical shutter parts including the second optical shutter part, wherein each pixel device of the plurality of pixel devices may include a plurality of sub pixels and an aperture, each respective first optical shutter part of the plurality of first optical shutter parts may include a first optical shutter corresponding to the plurality of sub pixels of the respective first optical shutter part, and each respective second optical shutter part of the plurality of first optical shutter parts may include a second optical shutter corresponding to the plurality of sub pixels of the respective second optical shutter part.

The display apparatus may further include a plurality of third optical shutter parts, wherein each third optical shutter part of the plurality of third optical shutter parts corresponds to the aperture of a pixel device of the plurality of pixel devices, and the at least one processor may be further configured to, based on the first image and the second image being alternately displayed by the transparent display panel, control the plurality of third optical shutter parts to be in the closed state.

The at least one processor may be further configured to, based on the display apparatus being driven in a unidirectional display mode: control the transparent display panel to display one image in a first direction corresponding to the first side, control the open or close state of the first optical shutter part and the second optical shutter part for an optical shutter part disposed at an opposite direction from the image providing direction to be in the close state and an optical shutter part disposed at a same direction as with the image providing direction to be in the open state from among the first optical shutter part and the second optical shutter part.

The display apparatus may further include: a user interface; and a sensor, and the at least one processor may be further configured to identify the first direction based on at least one from among a user command received through the user interface or a user position identified through the sensor.

The first optical shutter part and the second optical shutter part include reflective optical shutters configured to reflect light, the first optical shutter part may be configured to reflect light incident to the first optical shutter part while in the closed state, and the second optical shutter part may be configured to reflect light incident to the second optical shutter part while in the closed state.

Each pixel device of the plurality of pixel devices may include a plurality of sub pixels and an aperture, the transparent display panel may further include a plurality of transparent electrodes corresponding to the plurality of pixel devices, and the plurality of transparent electrodes may be cover at least at least part of either the first side or the second side of the plurality of sub pixels of each pixel device of the plurality of pixel devices.

Each pixel device of the plurality of pixel devices may include a plurality of sub pixels and an aperture, the transparent display panel may further include a plurality of opaque electrodes corresponding to the plurality of pixel devices, and the plurality of opaque electrodes may be disposed to cover at least part of either the first side or the second side of the plurality of sub pixels of each pixel device of the plurality of pixel devices.

The transparent display panel may further include: a transparent substrate disposed at one side of the first optical shutter part; and a scattering layer disposed at a front surface of the transparent substrate and the second optical shutter part, respectively.

According to an aspect of the disclosure, a method of controlling a display apparatus, the method includes: controlling a transparent display panel of the display apparatus to alternately display a first image and a second image at a pre-set output frequency, wherein the transparent display panel may include a plurality of pixel devices; controlling a first optical shutter part of the display apparatus and a second optical shutter part of the display apparatus to be in an open state or a closed state based on the pre-set output frequency, wherein the first optical shutter part is provided at a first side of the plurality of pixel devices, and the second optical shutter part is provided at a second side of the plurality of pixel devices opposite from the first side; controlling the second optical shutter part to be in the closed state while the first optical shutter part is in the open state; and controlling the second optical shutter part to be in the open state while the first optical shutter part is in the closed state.

The method may further include controlling the first optical shutter part and the second optical shutter part to be open and closed at a frequency two times greater than the pre-set output frequency.

The display apparatus may include a plurality of first optical shutter parts including the first optical shutter part and a plurality of second optical shutter parts including the second optical shutter part, each pixel device of the plurality of pixel devices may include a plurality of sub pixels and an aperture, each respective first optical shutter part of the plurality of first optical shutter parts may include a first optical shutter corresponding to the plurality of sub pixels of the respective first optical shutter part, and each respective second optical shutter part of the plurality of first optical shutter parts may include a second optical shutter corresponding to the plurality of sub pixels of the respective second optical shutter part.

The method may further include, based on the first image and the second image being alternately displayed by the transparent display panel, controlling a plurality of third optical shutter parts of the display apparatus to be in the closed state, wherein each third optical shutter part of the plurality of third optical shutter parts corresponds to the aperture of a pixel device of the plurality of pixel devices.

The method may further include, based on the display apparatus being driven in a unidirectional display mode: controlling the transparent display panel to display one image in a first direction corresponding to the first side; and controlling the open or close state of the first optical shutter part and the second optical shutter part for an optical shutter part disposed at an opposite direction from the image providing direction to be in the close state and an optical shutter part disposed at a same direction as with the image providing direction to be in the open state from among the first optical shutter part and the second optical shutter part.

The method may further include identifying the first direction based on at least one from among a user command received through a user interface of the display apparatus or a user position identified through a sensor of the display apparatus.

According to an aspect of the disclosure, a non-transitory computer readable medium has instructions stored therein, which when executed by at least one processor cause the at least one processor to execute a method of controlling a display apparatus, the method including: controlling a transparent display panel of the display apparatus to alternately display a first image and a second image at a pre-set output frequency, wherein the transparent display panel may include a plurality of pixel devices; controlling a first optical shutter part of the display apparatus and a second optical shutter part of the display apparatus to be in an open state or a closed state based on the pre-set output frequency, wherein the first optical shutter part is provided at a first side of the plurality of pixel devices, and the second optical shutter part is provided at a second side of the plurality of pixel devices opposite from the first side; controlling the second optical shutter part to be in the closed state while the first optical shutter part is in the open state; and controlling the second optical shutter part to be in the open state while the first optical shutter part is in the closed state.

The display apparatus may include a plurality of first optical shutter parts including the first optical shutter part and a plurality of second optical shutter parts including the second optical shutter part, each pixel device of the plurality of pixel devices may include a plurality of sub pixels and an aperture, and the method may further include, based on the first image and the second image being alternately displayed by the transparent display panel, controlling a plurality of third optical shutter parts of the display apparatus to be in the closed state, wherein each third optical shutter part of the plurality of third optical shutter parts corresponds to the aperture of a pixel device of the plurality of pixel devices.

The non-transitory computer readable medium, wherein the method further comprises, based on the display apparatus being driven in a unidirectional display mode: controlling the transparent display panel to display one image in a first direction corresponding to the first side; and controlling the open or close state of the first optical shutter part and the second optical shutter part for an optical shutter part disposed at an opposite direction from the image providing direction to be in the close state and an optical shutter part disposed at a same direction as with the image providing direction to be in the open state from among the first optical shutter part and the second optical shutter part.

The non-transitory computer readable medium, wherein the method further comprises: identifying the first direction based on at least one from among a user command received through a user interface of the display apparatus or a user position identified through a sensor of the display apparatus.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Example embodiments of the disclosure will be described in detail below with reference to the accompanying drawings.

Terms used in the disclosure will be briefly described, and the disclosure will be described in detail The terms used in describing an embodiment of the disclosure are general terms selected that are currently widely used considering their function herein. However, the terms may change depending on intention, legal or technical interpretation, emergence of new technologies, and the like of those skilled in the related art. Further, in certain cases, there may be terms arbitrarily selected, and in this case, the meaning of the term will be disclosed in greater detail in the corresponding description. Accordingly, the terms used herein are not to be understood simply as its designation but based on the meaning of the term and the overall context of the disclosure.

In the disclosure, expressions such as "have," "may have," "include," or "may include" are used to designate a presence of a corresponding characteristic (e.g., elements such as numerical value, function, operation, or component), and not to preclude a presence or a possibility of additional characteristics.

The expression "at least one of A and/or B" is to be understood as indicating any one of "A" or "B" or "A and B."

Expressions such as "first," "second," "1st," "2nd," and so on used herein may be used to refer to various elements regardless of order and/or importance. Further, it should be noted that the expressions are merely used to distinguish an element from another element and not to limit the relevant elements.

When a certain element (e.g., first element) is indicated as being "(operatively or communicatively) coupled with/to" or "connected to" another element (e.g., second element), it may be understood as the certain element being directly coupled with/to the another element or as being coupled through other element (e.g., third element).

A singular expression includes a plural expression, unless otherwise specified. It is to be understood that the terms such as "form" or "include" are used herein to designate a presence of a characteristic, number, step, operation, element, component, or a combination thereof, and not to preclude a presence or a possibility of adding one or more of other characteristics, numbers, steps, operations, elements, components or a combination thereof.

The term "module" or "part" used in an embodiment herein perform at least one function or operation, and may be implemented with a hardware or software, or implemented with a combination of hardware and software. Further, a plurality of "modules" or a plurality of "parts," except for a "module" or a "part" which needs to be implemented to a specific hardware, may be integrated to at least one module and implemented in at least one processor.

Figure 1:
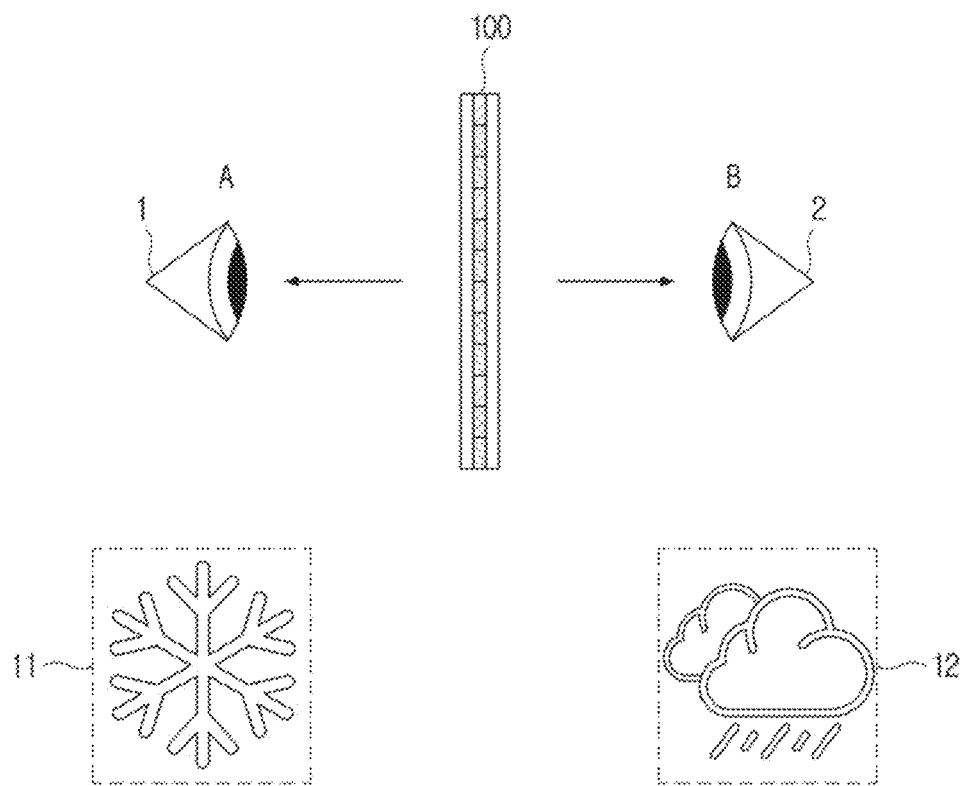
FIG. 1 is a diagram schematically illustrating a control method of a display apparatus according to an embodiment.

FIG. 1 is a diagram schematically illustrating a control method of a display apparatus according to an embodiment.

Referring to FIG. 1, a display apparatus 100 according to an embodiment may be implemented as a transparent display apparatus. A transparent display apparatus 100 may display information while in a state in which an object positioned at a rear direction of the display apparatus 100 is transparently shown through. Here, the information may be an image, a text, a content play-back screen, an application execution screen, a web browser screen, various graphic objects, and the like.

The display apparatus 100 according to an embodiment may display an image in a first direction at which a first user 1 is positioned and in a second direction at which a second user 2 is positioned. According to an example, the display apparatus 100 may display a first image 11 in the first direction, and display a second image 12 in the second direction by blocking the image displayed in the second direction while a first image 11 is being displayed, and blocking the image displayed in the first direction while the second image 12 is being displayed. In this case, an optical shutter included in the display apparatus 100 may be used to block the image displayed in a specific direction. Meanwhile, the first image 11 and the second image 12 according to an example may be a different image, but is not limited thereto, and the first image 11 and the second image 12 may be a same image.

According to an example, an image frame of the first image 11 and an image frame of the second image 12 may be alternately displayed at a pre-set output frequency. Accordingly, the user 1 positioned at the first direction may be able to view the first image, and the user positioned at the second direction may be able to view the second image.

Various embodiments in which a plurality of images is simultaneously provided to a user by displaying an image in a plurality of display directions using a plurality of optical shutters will be described below.

Figure 2:
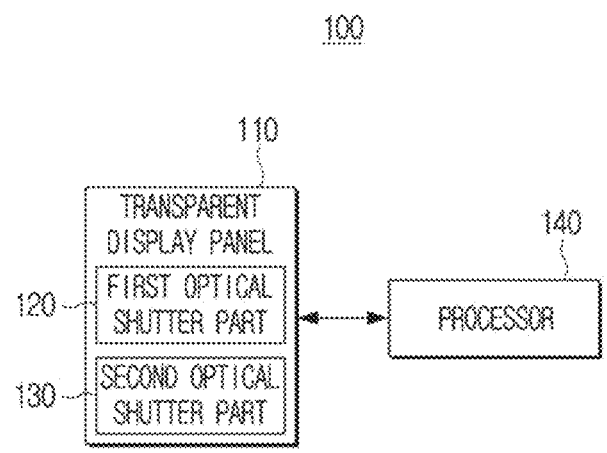
FIG. 2 is a block diagram illustrating a configuration of a display apparatus according to an embodiment.

FIG. 2 is a block diagram illustrating a configuration of a display apparatus according to an embodiment.

Referring to FIG. 2, the display apparatus 100 may include a transparent display panel 110, a first optical shutter part 120, a second optical shutter part 130, and at least one processor 140.

The display apparatus 100 may be implemented as various devices capable of playing back image content by including a display such as, for example, and without limitation, a smart television (TV), a tablet, a monitor, a smart phone, a desktop computer, a laptop computer, and the like according to an embodiment. The display apparatus 100 according to an embodiment of the disclosure is not limited to the above-described devices, and the display apparatus 100 may be implemented as the display apparatus 100 with at least two functions of the above-described devices.

The display apparatus 100 according to an embodiment may communicatively connect with an external device through various methods. According to an embodiment, a communication module for communication with the external device may be identically implemented. For example, the display apparatus 100 may communicate with the external device using a Bluetooth module.

The transparent display panel 110 according to an embodiment may be implemented as a display including self-emissive devices or a display including non-emissive devices. For example, the above may be implemented as a display of various types such as, for example, and without limitation, a liquid crystal display (LCD), an organic light emitting diode (OLED) display, a light emitting diode (LED), a micro LED, a mini LED, or the like. In the transparent display panel 110, a driving circuit, which may be implemented in the form of an a-si TFT, a low temperature poly silicon (LTPS) TFT, an organic TFT (OTFT), an oxide TFT, or the like, may be included together therewith.

The transparent display panel 110 according to an embodiment may be implemented as a display panel of different types (e.g., a transparent LCD panel, a transparent LED panel, or a transparent OLED panel). The transparent LCD panel may refer to a transparent display apparatus implemented using a backlight unit disposed at one side of the display apparatus, a pair of polarizing plates, an optical film, a transparent thin film transistor, a transparent electrode, and the like. In a transparent LCD apparatus, although transmittance is decreased by a polarizing plate, an optical film, or the like, and light efficiency is deteriorated because ambient light is used rather than the backlight unit, there is an advantage in that a large area transparent display may be implemented.

A transparent OLED-type panel may refer to the transparent display panel which uses an OLED capable of self-emissions. Because an organic light emitting layer is transparent, it may be possible to implement as the transparent display panel when both side electrodes are used as transparent electrodes. The OLED may emit light as electrons and holes are injected from both sides of the organic light emitting layer and both are combined within the organic light emitting layer. The transparent OLED panel may inject the electrons and holes to a desired position using such principles, and display information. In addition to the above, the transparent display panel may be implemented as an LED panel.

The transparent display panel 110 may include an aperture according to an embodiment. That is, transparency of the display panel 110 may increase as a ratio of apertures in the transparent display panel 110 increases. Here, the aperture may perform a passageway role through which light diverged from the light emitting layer formed of a plurality of sub pixels is emitted.

The transparent display panel 110 according to an embodiment may be implemented as a touch screen coupled with a touch sensor, a flexible display, a rollable display, a three-dimensional display (3D display), a display physically coupled with a plurality of display modules, or the like. The at least one processor 140 according to an example may control the transparent display panel 110 to output an output image obtained according to the various embodiments described above. Here, the output image may be a high-resolution image of 4K or greater than or equal to 8K.

The transparent display panel 110 according to an embodiment may include a plurality of pixel devices. The transparent display panel 110 may include a plurality of pixel devices arranged in a pre-set form (e.g., a matrix form), and the plurality of pixel devices may include the plurality of sub pixels. For example, a pixel device included in the transparent display panel 110 may include a plurality of types of sub pixels such as a red (or R) sub pixel, a green (or G) sub pixel, and a blue (or B) sub pixel. That is, one set of the R, G, B sub pixels may be included in one unit pixel of the transparent display panel 110. The above will be described in detail through FIG. 5A to FIG. 5B.

In the display apparatus 100 according to an embodiment, a plurality of optical shutter parts may be included. An optical shutter may refer to an optical module having a transmitting function or a blocking function of an optical image according to a control signal of the processor 140. According to an example, a first optical shutter part 120 and a second optical shutter part 130 may be included in the display apparatus 100.

According to an example, the plurality of pixel devices including the plurality of sub pixels may be included in the transparent display panel 110, and a first optical shutter and a second optical shutter corresponding to the plurality of sub pixels may be included. That is, the first optical shutter and the second optical shutter corresponding to the respective sub pixels may be included in the transparent display panel 110. Accordingly, a plurality of first optical shutters and a plurality of second optical shutters may be included in the transparent display panel 110, and the first optical shutter part 120 may refer to a group of the plurality of first optical shutters and the second optical shutter part 130 may refer to a group of the plurality of second optical shutters. According to an example, the first optical shutter part 120 and the second optical shutter part 130 may be included in the transparent display panel 110.

According to an example, the first optical shutter part 120 and the second optical shutter part 130 may be in any one state from among an open state or a closed state. If the optical shutter part is in the open state, light diverged from the plurality of pixel devices may be able to pass in a direction at which the optical shutter part is provided, and if the optical shutter part is in the closed state, light diverged from the plurality of pixel devices may not be able to pass in the direction at which the optical shutter part is provided. For example, if the first optical shutter part 120 is in the open state and the second optical shutter part 130 is in the closed state, the light diverged from the plurality of pixel devices may pass in the direction at which the first optical shutter part 120 is provided, but may not pass in the direction at which the second optical shutter part 130 is provided. The above will be described in detail through FIG. 4C.

The first optical shutter part 120 and the second optical shutter part 130 according to an example may be included in the transparent display panel 110. According to an example, the first optical shutter part 120 may be provided at one side of the plurality of pixel devices included in the transparent display panel 110, and the second optical shutter part 130 may be provided at an opposite side of the plurality of pixel devices. For example, the first optical shutter part 120 and the second optical shutter part 130 may be divided respectively at a top surface and a bottom surface of the plurality of pixel devices, respectively. However, the disclosure is not limited thereto. A disposition structure of the first optical shutter part 120 and the second optical shutter part 130 will be described in detail through FIG. 4C.

The at least one processor 140 (hereinafter, referred to as a processor) may control the overall operation of the display apparatus 100 by being electrically connected with the transparent display panel 110, the first optical shutter part 120, and the second optical shutter part 130. The processor 140 may be formed of one or a plurality of processors. Specifically, the processor 140 may perform, by executing at least one instruction stored in a memory, an operation of the display apparatus 100 according to the various embodiments of the disclosure.

The processor 140 according to an embodiment may be implemented as a digital signal processor (DSP) for processing a digital image signal, a microprocessor, a graphics processing unit (GPU), an artificial intelligence (AI) processor, a neural processing unit (NPU), or a time controller (TCON). However, the disclosure is not limited thereto, and may include one or more from among a central processing unit (CPU), a micro controller unit (MCU), a micro processing unit (MPU), a controller, an application processor (AP), a communication processor (CP), or an ARM processor, or may be defined by the corresponding term. In addition, the processor 140 may be implemented as a System on Chip (SoC) or a large scale integration (LSI) in which a processing algorithm is embedded, and may be implemented in the form of an application specific integrated circuit (ASIC) or a field programmable gate array (FPGA).

The processor 140 according to an embodiment may control the transparent display panel 110 to alternately display different images. According to an example, a panel driver for driving the transparent display panel 110 may be further included in the display apparatus 100, and the processor 140 may control a plurality of driving circuits included in the transparent display panel 110 through the panel driver to display an image. However, the disclosure is not limited thereto.

According to an example, the processor 140 may control the transparent display panel 110 to alternately display the first image and the second image at a pre-set output frequency. For example, the processor 140 may obtain image information of the first image and the second image which is different from the first image being alternately displayed respectively at 60 Hertz (Hz) which is the pre-set output frequency, and alternately display the first image and the second image through the transparent display panel 110 using the obtained image information. Specifically, the processor 140 may alternately display the first image and the second image by controlling the plurality of pixel devices included in the transparent display panel 110. In this case, an image in which the first image and the second image are alternately displayed may be displayed at an output frequency (output frequency of the first image+output frequency of the second image) of 120 Hertz (Hz). The above will be described in detail through FIG. 4B.

According to an embodiment, the processor 140 may control the open or closed state of the first optical shutter part 120 and the second optical shutter part 130 for the first optical shutter part 120 and the second optical shutter part 130 to be opened or closed based on the pre-set output frequency. According to an example, the processor 140 may control for the first optical shutter part 120 to be in the open state by transmitting a control signal for the first optical shutter part 120 to be opened to the first optical shutter part 120. Alternatively, the processor according to an example may control for the second optical shutter part 130 to be in the closed state by transmitting a control signal for the second optical shutter part 130 to be closed to the second optical shutter part 130.

In this case, the processor 140 according to an example may transmit a control signal to the first optical shutter part 120 and the second optical shutter part 130, respectively, for the first optical shutter part 120 and the second optical shutter part 130 to be opened or closed based on an output frequency for the first image and the second image to be alternately displayed.

For example, an output frequency of an image for the first image and the second image to be alternately displayed being 120 Hertz according to the pre-set output frequency corresponding respectively to the first image and the second image being 60 Hertz (Hz) may be assumed. The processor 140 may transmit a control signal for the open or closed state of the first optical shutter part 120 to be changed with the output frequency of 120 Hertz which is two times of the pre-set output frequency of 60 Hertz (Hz) to the first optical shutter part 120, and transmit a control signal for the open or closed state of the second optical shutter part 130 to be changed with the output frequency of 120 Hertz which is two times of the pre-set output frequency of 60 Hertz (Hz) to the second optical shutter part 130. Accordingly, the open or closed state of the first optical shutter part 120 may be changed to 120 times per 1 second, and likewise, the open or closed state of the second optical shutter part 130 may also be changed to 120 times per second.

According to an embodiment, the processor 140 may control the open or closed state of the first optical shutter part 120 and the second optical shutter part 130 for the second optical shutter part 130 to be in the closed state while the first optical shutter part 120 is in the open state, and for the second optical shutter part 130 to be in the open state while the first optical shutter part 120 is in the closed state.

According to an example, the open or closed state of the first optical shutter part 120 and the second optical shutter part 130 being changed respectively with the frequency of 120 Hertz may be assumed. In this case, the processor 140 may transmit a control signal for the second optical shutter part 130 to be in the closed state while the first optical shutter part 120 is in the open state to the first optical shutter part 120 and the second optical shutter part 130. Accordingly, the open or closed state of the first optical shutter part 120 and the second optical shutter part 130 may be different.

According to an embodiment, the processor 140 may control the open or closed state of the first optical shutter part 120 and the second optical shutter part 130 according to a type of image being displayed. According to an example, the processor 140 may transmit a control signal for the first optical shutter part 120 to be in the open state and the second optical shutter part 130 to be in the closed state to the first optical shutter part 120 and the second optical shutter part 130, respectively, while the first image is displayed through the plurality of pixel devices. Alternatively, the processor 140 according to an example may transmit the control signal for the second optical shutter part 130 to be in the open state and the first optical shutter part 120 to be in the closed state to the first optical shutter part 120 and the second optical shutter part 130, respectively, while the second image is displayed through the plurality of pixel devices.

That is, if an image frame corresponding to the first image and an image frame corresponding to the second image are alternately displayed 60 times per second, respectively, the open or closed state of the first optical shutter part 120 and the second optical shutter part 130 may be changed 120 times per second, respectively. According to the example described above, the first optical shutter part 120 may be in the open state and the second optical shutter part 130 may be in the closed state while the image frame corresponding to the first image is displayed, and accordingly, the image frame corresponding to the first image may be displayed only in the direction at which the first optical shutter part 120 is provided. Likewise, the second optical shutter part 130 may be in the open state and the first optical shutter part 120 may be in the closed state while the image frame corresponding to the second image is displayed, and accordingly, the image frame corresponding to the second image may be displayed only in the direction at which the second optical shutter part 130 is provided.

According to the example described above, an image may be displayed in different directions respectively using the plurality of optical shutter parts provided in the display apparatus 100. Accordingly, a plurality of images may be displayed even when a transparent display panel with a single light emitting layer is used and thereby, economic feasibility may be secured and user satisfaction may be enhanced.

Figure 3:
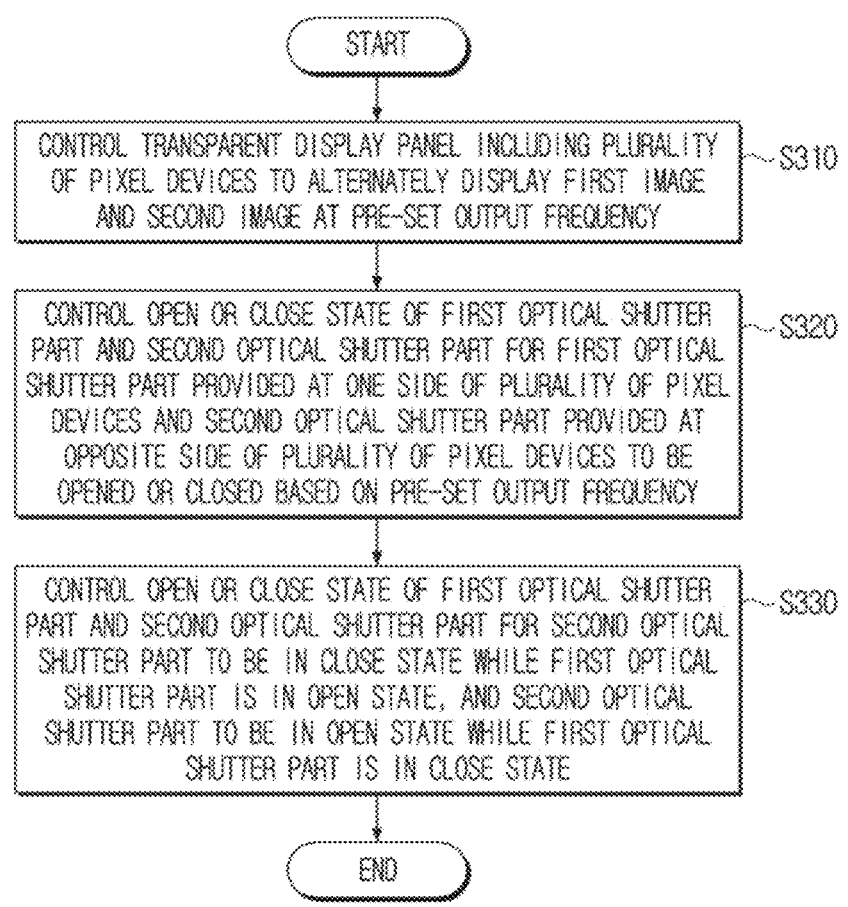
FIG. 3 is a flowchart illustrating a control method of a display apparatus according to an embodiment.

FIG. 3 is a flowchart illustrating a control method of a display apparatus according to an embodiment.

Referring to FIG. 3, the control method according to an embodiment may include controlling the transparent display panel 110 including the plurality of pixel devices to alternately display the first image and the second image at the pre-set output frequency (S310). According to an example, the processor 140 may obtain image information of the first image and the second image which is different from the first image being alternately displayed respectively at 60 Hertz (Hz) which is the pre-set output frequency, and alternately display the first image and the second image through the transparent display panel 110 using the obtained image information.

Then, the control method according to an embodiment may include controlling the open or closed state of the first optical shutter part 120 and the second optical shutter part 130 for the first optical shutter part 120 provided at one side of the plurality of pixel devices and the second optical shutter part 130 provided at the opposite side of the plurality of pixel devices to be opened or closed according to the pre-set output frequency (S320). According to an example, the processor 140 may control for the first optical shutter part 120 to be in the open state by transmitting a control signal for the first optical shutter part 120 to be opened to the first optical shutter part 120. Alternatively, the processor 140 according to an example may control for the second optical shutter part 130 to be in the closed state by transmitting a control signal for the second optical shutter part 130 to be closed to the second optical shutter part 130.

The control method according to an embodiment may include controlling the open or closed state of the first optical shutter part 120 and the second optical shutter part 130 for the second optical shutter part 130 to be in the closed state while the first optical shutter part 120 is in the open state, and the second optical shutter part 130 to be in the open state while the first optical shutter part 120 is in the closed state (S330). According to an example, the open or closed state of the first optical shutter part 120 and the second optical shutter part 130 being changed with a frequency of 120 Hertz respectively may be assumed. In this case, the processor 140 may transmit a control signal for the second optical shutter part 130 to be in the closed state while the first optical shutter part 120 is in the open state to the first optical shutter part 120 and the second optical shutter part 130. Accordingly, the open or closed state of the first optical shutter part 120 and the second optical shutter part 130 may be different.

Figure 4A:
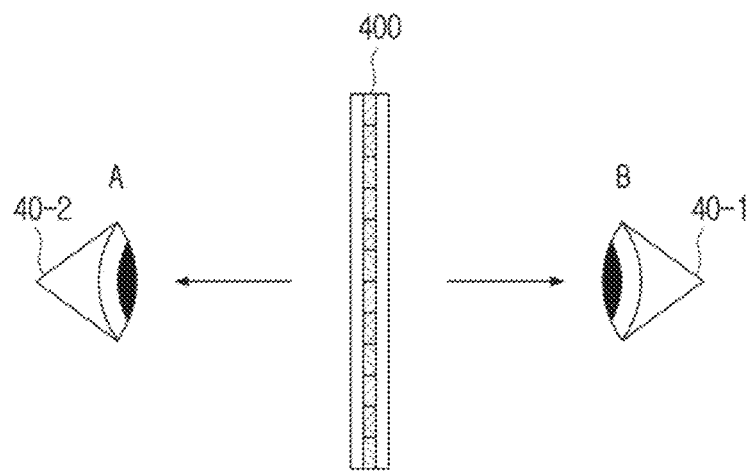
FIGS. 4A, 4B and FIG. 4C are diagrams illustrating a driving method of a display apparatus according to an embodiment.
Figure 4A:
Figure 4B:
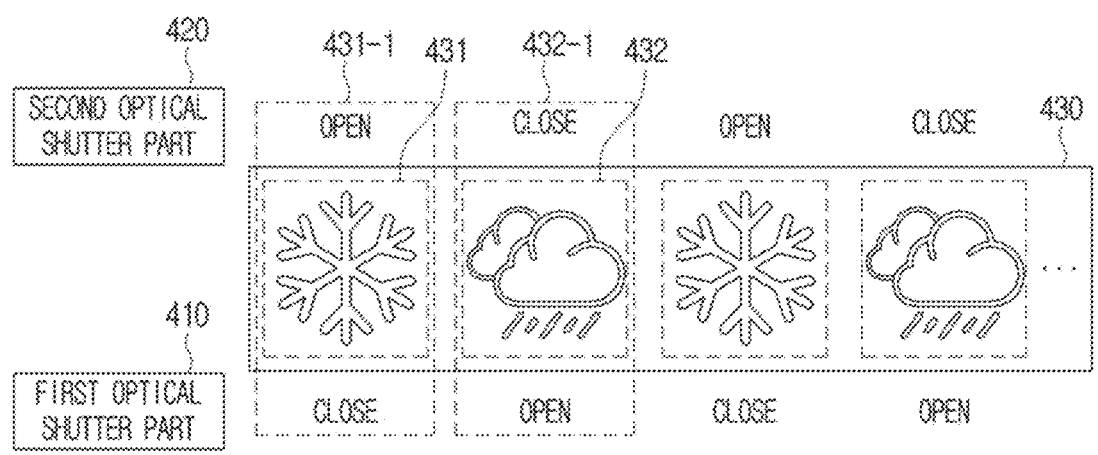
Figure 4C:
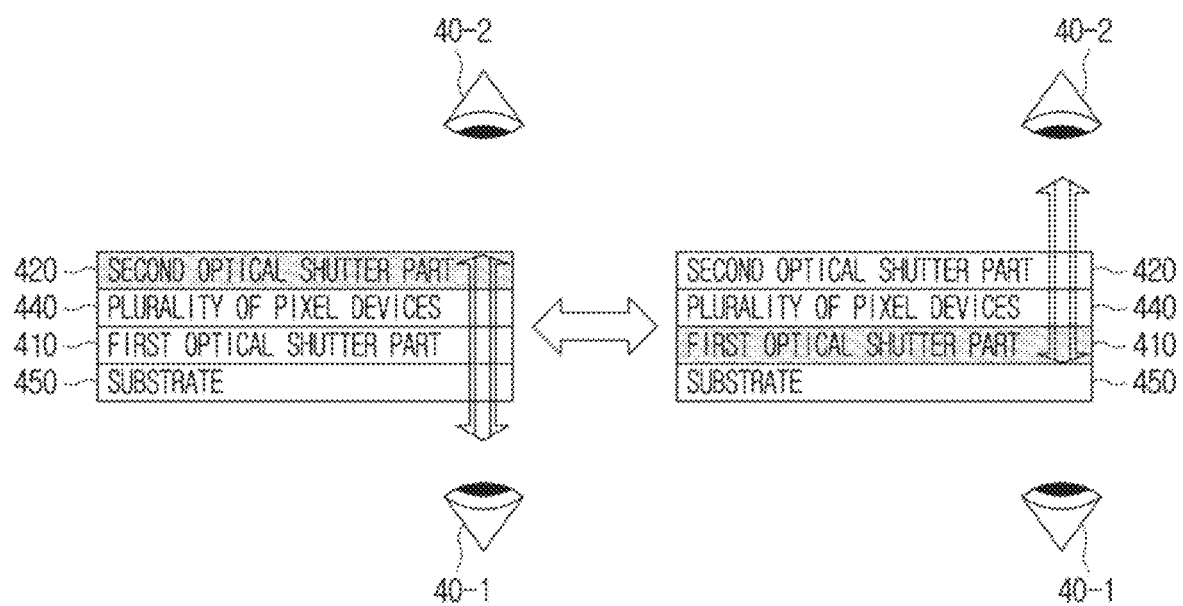

FIG. 4A to FIG. 4C are diagrams illustrating a driving method of a display apparatus according to an embodiment.

According to FIG. 4A, the processor 140 according to an embodiment may display an image in different directions. According to an example, the first optical shutter part 120 being provided at a first side based on the plurality of pixel devices included in the transparent display panel 110 may be assumed. If a first image 41 and a second image 42 are alternately displayed at a pre-set output frequency (e.g., 60 Hertz respectively) through a display apparatus 400, the processor 140 may control for the first optical shutter part 120 provided at the first side to be in the open state, and control for the second optical shutter part 130 to be in the closed state while the first image 41 is displayed. Accordingly, the first image may be displayed in the first direction corresponding to the first side, and a user 40-1 positioned in the first direction corresponding to the first side may be able to view the first image displayed at an output frequency of 60 Hertz.

In addition, according to an example, the second optical shutter part 130 being provided at a second side based on the plurality of pixel devices included in the transparent display panel 110 may be assumed. If the first image 41 and the second image 42 are alternately displayed at the pre-set output frequency (e.g., 60 Hertz respectively), the processor 140 may control for the second optical shutter part 130 provided at the second side to be in the open state, and control for the first optical shutter part 120 provided at the first side to be in the closed state while the second image 42 is displayed. Accordingly, the second image may be displayed in the second direction corresponding to the second side, and a user 40-2 positioned in the second direction corresponding to the second side may be able to view the second image 42 displayed at an output frequency of 60 Hertz. However, the disclosure is not limited thereto, and the first image 41 and the second image 42 may be the same image.

Referring to FIG. 4B, the processor 140 according to an embodiment may control the open or closed state of a first optical shutter part 410 and a second optical shutter part 420 for the first optical shutter part 410 and the second optical shutter part 420 to be opened or closed at two times of the frequency of the pre-set output frequency.

According to an example, a first image 432 and a second image 431 being alternately displayed 430 at the pre-set output frequency (e.g., 60 Hertz), respectively, may be assumed. The processor 140 may control the first optical shutter part 410 and the second optical shutter part 420 respectively for the second optical shutter part 420 to be in the open state and the first optical shutter part 410 to be in the closed state while the second image 431 is displayed for a first time period 431-1. In addition, the processor 140 may control the first optical shutter part 410 and the second optical shutter part 420 respectively for the first optical shutter part 410 to be in the closed state and the second optical shutter part 420 to be in the open state while the first image 432 is displayed for a second time period 432-1. In order for the open or closed state of the first optical shutter part 410 and the second optical shutter part 420 to be changed according to the respective time periods at which the first image 432 and the second image 431 are alternately displayed, the processor 140 may control the open or closed state of the first optical shutter part 410 and the second optical shutter part 420 with two times of the frequency (e.g., 120 Hertz) of the pre-set output frequency.

However, the disclosure is not limited thereto, and a frequency value corresponding to a control signal for the open or closed state of the first optical shutter part 410 and the second optical shutter part 420 to be changed according to the output frequencies of the first image 432 and the second image 431 displayed may be changed. That is, if the output frequencies of the first image and the second image are respectively 120 Hertz, the control signal for the open or closed state of the first optical shutter part 410 and the second optical shutter part 420 to be changed may be 240 Hertz.

Referring to FIG. 4C, according to an embodiment, the first optical shutter part 410 may be provided at one side of a plurality of pixel devices 440 included in the transparent display panel 110, and the second optical shutter part 420 may be provided at an opposite side of the plurality of pixel devices 440. According to an example, the first optical shutter part 410 may be provided at a bottom surface of the plurality of pixel devices 440 based on FIG. 4C, and the second optical shutter part 420 may be provided at a top surface of the plurality of pixel devices 440.

First, the processor 140 may control for the first optical shutter part 120 provided at the first side to be in the open state, and control for the second optical shutter part 130 to be in the closed state while the first image 41 is displayed. Accordingly, the first image may be displayed in the first direction corresponding to the first side, and the user 40-1 positioned in the first direction corresponding to the first side may be able to view the first image displayed at the output frequency of 60 Hertz.

Alternatively, the processor 140 may control for the second optical shutter part 130 provided at the second side to be in the open state, and control for the first optical shutter part 120 provided at the first side to be in the closed state while the second image 42 is displayed. Accordingly, the second image may be displayed in the second direction corresponding to the second side, and the user 40-2 positioned in the second direction corresponding to the second side may be able to view the second image 42 displayed at the output frequency of 60 Hertz.

A substrate 450 may be disposed at one side of the first optical shutter part 410 according to an embodiment. The substrate 450 may be implemented as a transparent substrate, and in this case, a polymer material such as plastic or glass having transparent properties may be used to form the substrate 450. However, the disclosure is not limited thereto, and the material of the substrate 450 may be determined according to a use environment in which the transparent display apparatus 100 is applied.

According to the example described above, the display apparatus 400 may be able to control the open or closed state of the first optical shutter part 410 and the second optical shutter part 420 based on the output frequencies of the first image 41 and the second image 42 while the first image 41 and the second image 42 are alternately displayed. Accordingly, the first image 41 may be displayed at one side of the display apparatus 400, and the second image 42 may be displayed at an opposite side of the display apparatus 400. The user may be able to view the plurality of images from a plurality of positions from a single display apparatus 400, and accordingly, product usefulness may be increased.

Figure 5A:
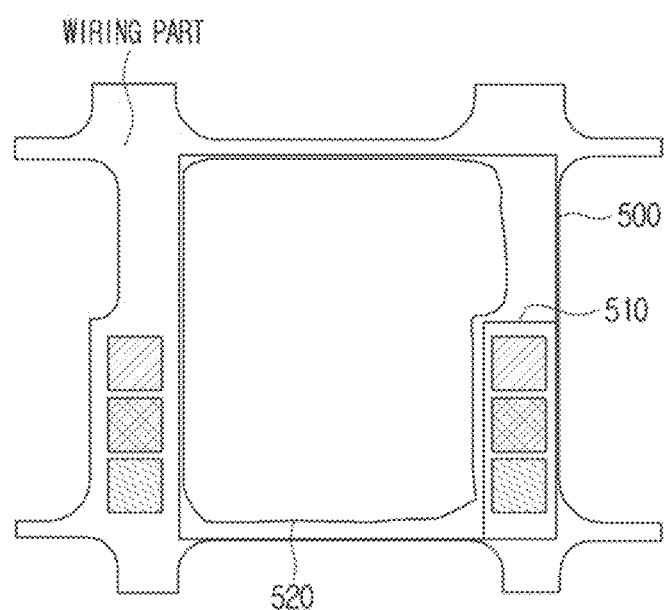
FIGS. 5A, 5B and FIG. 5C are diagrams illustrating a detailed configuration of a display apparatus.
Figure 5B:
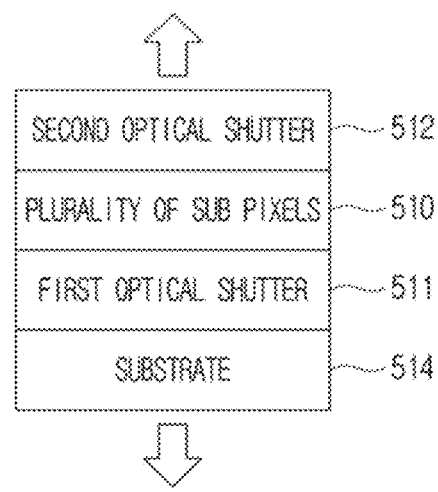
Figure 5C:
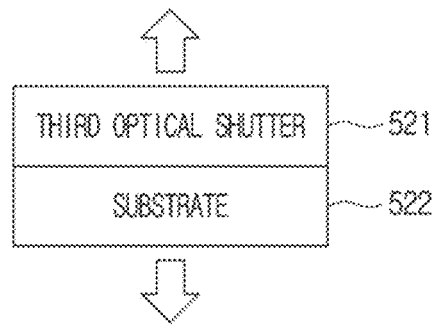

FIGS. 5A, 5B and 5C are diagrams illustrating a detailed configuration of a display apparatus.

Referring to FIG. 5C, the transparent display panel 110 according to an embodiment may include a plurality of pixel devices arranged in a pre-set form (e.g., matrix form), and the plurality of pixel devices may include a plurality of sub pixels. According to an example, a single pixel device 500 may include a plurality of sub pixels 510, an aperture 520, and a wiring part.

The plurality of sub pixels 510 may include a plurality of types of sub pixels such as a red (or R) sub pixel, a green (or G) sub pixel, and a blue (or B) sub pixel. That is, one set included with the R, G, and B sub pixels may be included in the one unit pixel of the transparent display panel 110. According to an example, driving circuits for driving the respective sub pixels may be provided, respectively. The aperture 520 may perform a pathway role through which light diverged from the plurality of sub pixels 510 is emitted, and the wiring part may refer to a part that supplies power to the plurality of pixel devices or transfers electric signals.

In the example described above, a pixel has been described as being formed of three types of sub pixels, but is not limited thereto. For example, the pixel may be implemented with four types of sub pixels such as R, G, B and white (or W), and any different number of sub pixels may form one pixel according to an embodiment. However, for convenience of description, the pixel will be described limited to when the pixel is formed of three types of sub pixels such as R, G, and B.

The first optical shutter part 120 according to an embodiment may include the first optical shutter corresponding to the plurality of sub pixels 510, and the second optical shutter part 130 may include the second optical shutter corresponding to the plurality of sub pixels 510. According to an example, the first optical shutter and the second optical shutter corresponding to the respective pixel devices may be provided at one side of the plurality of sub pixels 510 included in the pixel device 500. Accordingly, in the transparent display panel 110 which includes the plurality of pixel devices, a number of the first optical shutter and the second optical shutter corresponding to a number of the pixel devices may be included. The first optical shutter part 120 may include the first optical shutter in plurality included in the transparent display panel 110, and the second optical shutter part 130 may include the second optical shutter in plurality included in the transparent display panel 110.

Referring to FIG. 5B, according to an embodiment, the first optical shutter and the second optical shutter corresponding to the plurality of sub pixels 510 included in the respective pixel devices may be provided at one side of the plurality of sub pixels 510. According to an example, a first optical shutter 511 may be provided at the first side, and a second optical shutter 512 may be provided at the second side based on the plurality of sub pixels 510. However, the disclosure is not limited thereto, and the second optical shutter 512 may be provided at the first side, and the first optical shutter 511 may be provided at the first side based on the plurality of sub pixels 510.

Referring to FIG. 5C, the transparent display panel 110 according to an embodiment may further include a third optical shutter part corresponding to the aperture 520 provided at the respective pixel devices. According to an example, a third optical shutter 521 corresponding to the aperture 520 corresponding to the respective pixel devices may be included in the transparent display panel 110, and accordingly, three optical shutters (the first optical shutter, the second optical shutter, and the third optical shutter) corresponding to the signal pixel device may be provided. The third optical shutter part according to an example may refer to a set of the third optical shutters 521 corresponding to the respective pixel devices.

According to an embodiment, the processor 140 may control the third optical shutter part for the third optical shutter part to be in the closed state while the first image and the second image are displayed in the transparent display panel 110. According to an example, the processor 140 may transmit a control signal for the third optical shutter part to be in the closed state while the first image and the second image are displayed in the transparent display panel 110 to the third optical shutter part. Accordingly, sharpness of the first image and the second image may be enhanced.

In this case, the processor 140 according to an example may transmit the control signal for the third optical shutter corresponding to the pixel device that emits light from among the plurality of pixel devices to be in the closed state to the third optical shutter based on information about the first image and the second image. Accordingly, the sharpness of the first image and the second image may be enhanced.

Figure 6A:
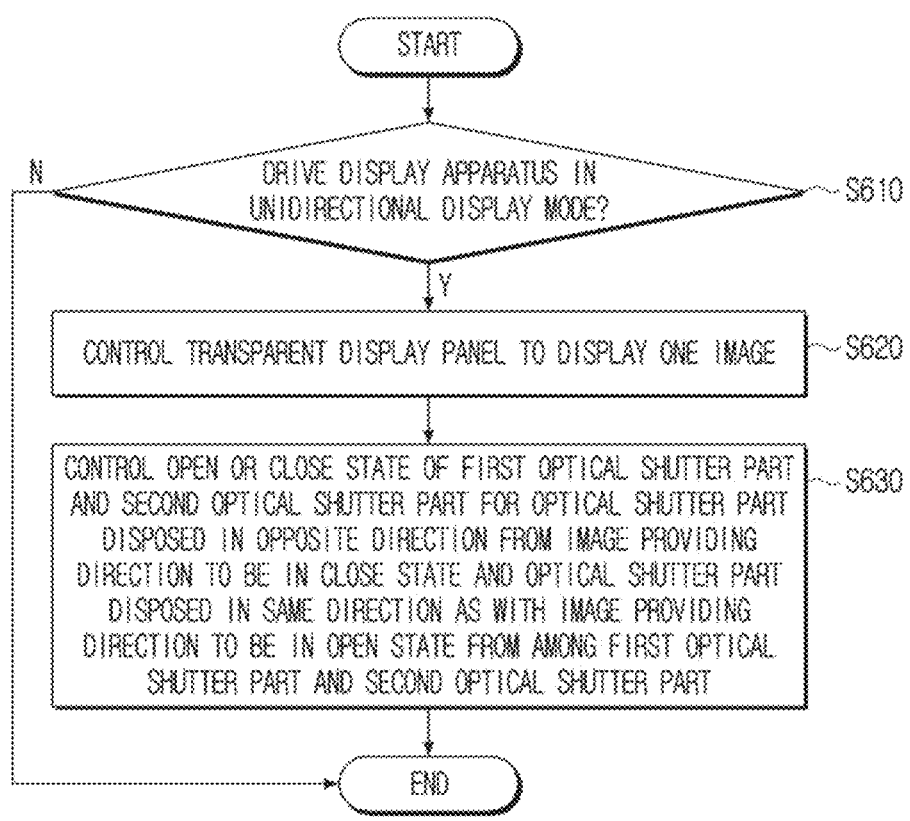
FIGS. 6A, 6B and FIG. 6C are diagrams illustrating a control method of a display apparatus from a unidirectional mode according to an embodiment.
Figure 6B:
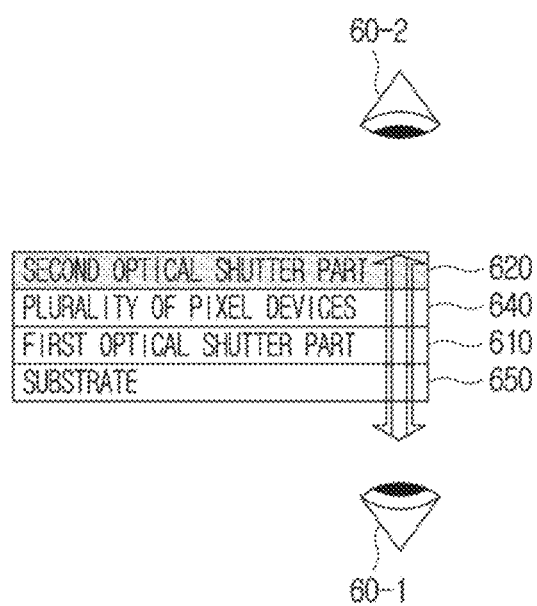
Figure 6C:
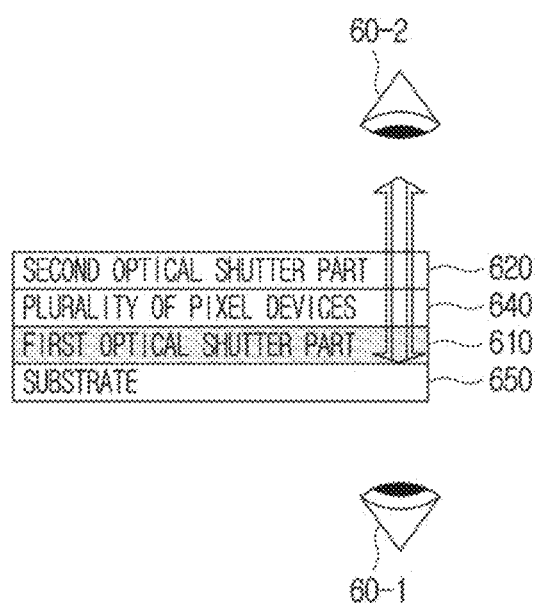

FIGS. 6A, 6B and 6C are diagrams illustrating a control method of a display apparatus from a unidirectional mode according to an embodiment.

Referring to FIG. 6A, the control method according to an embodiment may first identify whether the display apparatus 100 is driven in a unidirectional display mode (S610). According to an example, a display mode of the display apparatus 100 may be any one from among a bidirectional display mode or a unidirectional display mode. The processor 140 according to an example may identify whether the display apparatus 100 is operated in the unidirectional display mode based on an input by the user, but is not limited thereto.

Then, the control method according to an embodiment may include controlling, based on the display apparatus 100 operating in the unidirectional display mode (S610: Y), the transparent display panel 110 to display one image (S620).

According to an embodiment, the processor 140 may control the transparent display panel 110 to display only the first image if the display apparatus 100 is operated in the unidirectional display mode. For example, the processor 140 may separate, based on image information of the first image and the second image being alternately displayed being obtained, an image frame corresponding to the first image and an image frame corresponding to the second image using a pre-set algorithm, and obtain the first image and the second image respectively by grouping the respective image frames. The processor 140 may control the transparent display panel 110 to display the obtained first image.

However, the disclosure is not limited thereto, and if the display apparatus 100 is driven in the unidirectional display mode, the processor 140 according to an example may obtain image information for the first image and the second image respectively, and display any one from among the first image or the second image through the transparent display panel 110.

Then, the control method according to an embodiment may include controlling the open or closed state of the first optical shutter part 120 and the second optical shutter part 130 for the optical shutter part disposed in the opposite direction from the image providing direction to be in the closed state and the optical shutter part disposed in the same direction as with the image providing direction to be in the open state from among the first optical shutter part 120 and the second optical shutter part 130 (S630). The above will be described in detail through FIG. 6B and FIG. 6C.

Referring to FIG. 6B, the display apparatus 100 according to an embodiment operating in the unidirectional display mode may be assumed. If the image providing direction is a direction (or, first direction) in which a first optical shutter part 610 is provided relative to a plurality of pixel devices 640, the processor 140 may control the open or closed state of a first optical shutter part 610 for the first optical shutter part 610 corresponding to the first direction which is the image providing direction from among the first optical shutter part 610 and a second optical shutter part 620 to be in the open state, and control the open or closed state of the second optical shutter part 620 for the second optical shutter part 620 disposed at a second direction which is an opposite direction from the image providing direction to be in the closed state. Accordingly, a user 60-1 positioned in the first direction may be able to view an image provided in the first direction.

Referring to FIG. 6C, if the image providing direction according to an embodiment is a direction (or, second direction) in which the second optical shutter part 620 is provided relative to the plurality of pixel devices 640, the processor 140 may control the open or closed state of the second optical shutter part 620 for the second optical shutter part 620 corresponding to the second direction which is the image providing direction from among the first optical shutter part 610 and a second optical shutter part 620 to be in the open state, and control the open or closed state of the first optical shutter part 610 for the first optical shutter part 610 disposed at the first direction which is the opposite direction from the image providing direction to be in the closed state. Accordingly, a user 60-2 positioned in the second direction may be able to view an image provided in the second direction.

The processor 140 according to an example may identify the image providing direction based on at least one from among a received user command or an identified user position. For example, the display apparatus 100 may include a user interface. In this case, the processor 140 may control, based on a user command for an image to be provided in the first direction being received through the user interface, the transparent display panel 110 for the image to be provided in the first direction from among the first direction or the second direction.

Alternatively, for example, the display apparatus 100 may include a sensor. Here, the sensor may be a sensor for identifying a user, and may be implemented as, for example, an infrared sensor, a temperature sensor, or a camera sensor, but is not limited thereto. In this case, the processor 140 may identify a position of the user based on sensing data obtained through the sensor, and control the transparent display panel 110 for the image to be provided to any one from among the first direction or the second direction based on the identified position.

According to the example described above, if the display apparatus 100 is operated in the unidirectional display mode, the display apparatus 100 may be able to provide an image in any one providing direction from among a plurality of image providing directions. Accordingly, user convenience may be increased.

Figure 7:
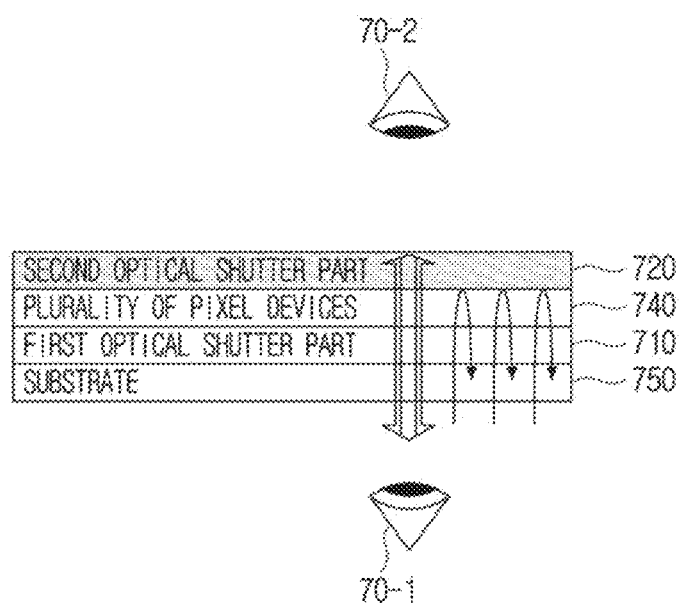
FIG. 7 is a diagram illustrating a reflective optical shutter according to an embodiment.

FIG. 7 is a diagram illustrating a reflective optical shutter according to an embodiment.

Referring to FIG. 7, according to an embodiment, a first optical shutter part 710 and a second optical shutter part 720 may be implemented as a reflective optical shutter by which light is reflected. According to an example, the first optical shutter part 710 may reflect light incident to the first optical shutter part 710 while in the closed state. The second optical shutter part 720 may reflect light incident to the second optical shutter part 720 while in the closed state. If the first optical shutter part 710 and the second optical shutter part 720 are implemented as reflective optical shutters, light efficiency of the display apparatus 100 may be increased, and a high-brightness display apparatus may be implemented.

Figure 8A:
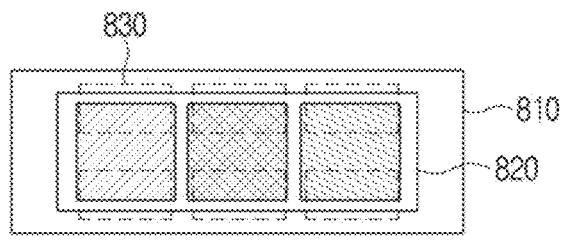
FIG. 8A and FIG. 8B are diagrams illustrating an electrode provided in a display apparatus according to an embodiment.
Figure 8B:
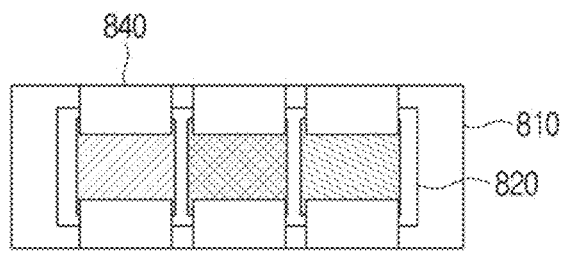

FIG. 8A and FIG. 8B are diagrams illustrating an electrode provided in a display apparatus according to an embodiment.

According to an embodiment, the respective pixel devices included in the transparent display panel 110 may include a plurality of sub pixels and an aperture, and the transparent display panel 110 may further include any one from among a transparent electrode or an opaque electrode. Here, the transparent electrode may be implemented with any one from among, for example, indium tin oxide (ITO), indium zinc oxide (IZO), indium gallium zinc oxide (IGZO), or graphene. Graphene may refer to a material having transparent properties that form a plane structure of a honeycomb shape in which carbon atoms are connected with one another. However, the disclosure is not limited thereto, and the transparent electrode may be implemented with a ultra-thin film metal electrode.

Referring to FIG. 8A, a transparent electrode 830 according to an example may be disposed to cover at least one area of a plurality of sub pixels 820 from one side of the respective sub pixels 820. Accordingly, the transparent electrode 830 may be disposed to cover one area of the plurality of sub pixels 820 and a wiring part 810, respectively. When the display apparatus 100 is implemented as the transparent electrode, transparency of the display apparatus 100 may be increased compared to when it is not implemented as the transparent electrode.

Referring to FIG. 8B, an opaque electrode 840 according to an example may be disposed to cover a smaller area than the at least one area of the plurality of sub pixels 820 from one side of the respective sub pixels 820. Accordingly, the opaque electrode 840 may be disposed to cover one area of plurality of sub pixels 820 and the wiring part 810, respectively, and in this case, the one area of the plurality of sub pixels 820 may be disposed such that the one area of plurality of sub pixels 820 is to be a relatively smaller area compared to the one area of the wiring part 810. The opaque electrode 840 according to an example may be an electrode generated with a same electrode material with that of the wiring part 810.

Figure 9:
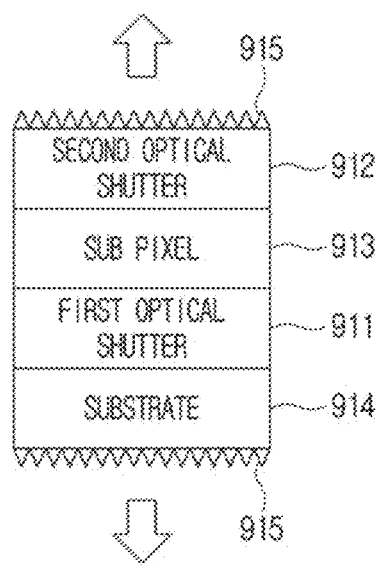
FIG. 9 is a diagram illustrating a scattering layer according to an embodiment.

FIG. 9 is a diagram illustrating a scattering layer according to an embodiment.

Referring to FIG. 9, according to an embodiment, transparent display panels 911 to 915 may further include a transparent substrate 914 and a scattering layer 915. According to an example, the transparent substrate 914 may be a substrate generated with a polymer material such as plastic having transparent properties or with glass. The scattering layer may refer to a layer with surfaces of the transparent display panels 911 to 915 adjusted to a pre-set roughness. To generate a color image for a human to easily recognize, a nanoparticle which is scattered relatedly strongly at a pre-set wavelength may be included in the scattering layer.

According to an example, a transparent substrate 914 may be disposed at one side of a first optical shutter part 911, and a scattering layer 915 may be disposed at the front surfaces of the transparent substrate 914 and a second optical shutter part 912, respectively. However, the disclosure is not limited thereto, and the transparent substrate 914 may be disposed at one side of the second optical shutter part 912 unlike as shown in FIG. 9, and the scattering layer 915 may be disposed at the front surfaces of the transparent substrate 914 and the first optical shutter part 911, respectively.

Figure 10:
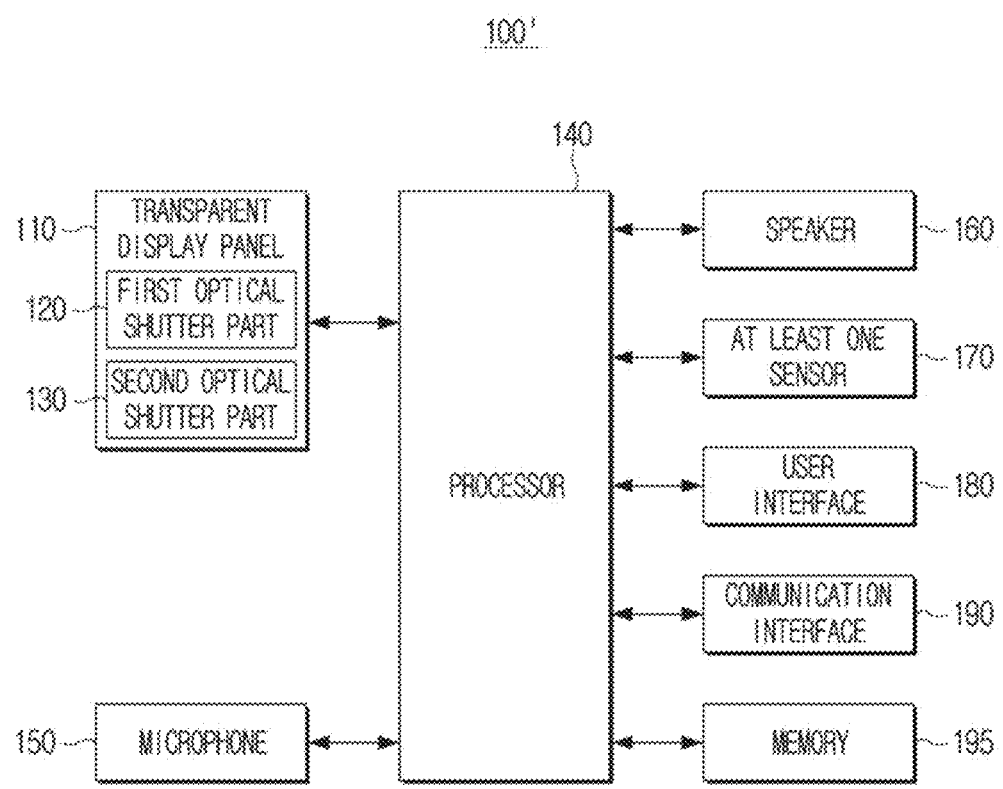
FIG. 10 is a block diagram illustrating a detailed configuration of a display apparatus according to an embodiment.

FIG. 10 is a block diagram illustrating a detailed configuration of a display apparatus according to an embodiment.

Referring to FIG. 10, a display apparatus 100' may include the transparent display panel 110, the first optical shutter part 120, the second optical shutter part 130, the at least one processor 140, a microphone 150, a speaker 160, at least one sensor 170, a user interface 180, a communication interface 190, and a memory 195. Detailed descriptions on configurations that overlap with the configurations shown in FIG. 2 from among the configurations shown in FIG. 10 will be omitted.

The microphone 150 may refer to a module that obtains sound and converts to an electric signal, and may be a condenser microphone, a ribbon microphone, a moving-coil microphone, a piezoelectric device microphone, a carbon microphone, or a micro electro mechanical system (MEMS) microphone. In addition, the above may be implemented in an omnidirectional method, a bidirectional method, a unidirectional method, a sub cardioid method, a super cardioid method, or a hyper cardioid method.

In an example, the display apparatus 100' may control the transparent display panel 110 based on a user voice signal received through the microphone 150. For example, if a user voice signal for displaying A-content is received, the display apparatus 100' may control the transparent display panel 110 to display the A-content.

The speaker 160 may be formed of a tweeter for playing high-range sound, a midrange for playing mid-range sound, a woofer for playing low-range sound, a sub-woofer for playing ultra-low range sound, an enclosure for controlling resonance, a cross-over network dividing electric signal frequencies which are input to the speaker into bandwidths, and the like.

The speaker 160 may output sound signals to outside of the display apparatus 100'. The speaker 160 may output playing of multi-media, playing of recordings, various notification sounds, voice messages, and the like. The display apparatus 100' may include audio output devices such as the speaker 160, but may include an output device such as an audio output terminal. Specifically, the speaker 160 may provide obtained information, information processed and manufactured based on the obtained information, a response result or operation result for a user voice, and the like in a voice form.

The at least one sensor 170 (hereinafter, referred to as a sensor) may include a plurality of sensors of various types. The sensor 170 may measure physical quantity or sense an operating state of the display apparatus 100', and convert the measured or sensed information to an electric signal. The sensor 170 may include a camera, and the camera may include a lens which focuses visible light and other optical signals received by being reflected by an object to an image sensor and an image sensor capable of sensing visible light and other optical signals. Here, the image sensor may include a 2-dimensional (2D) pixel array which is divided into a plurality of pixels. Alternatively, the at least one sensor 170 may include a temperature sensor or an infrared sensor.

The user interface 180 may be a configuration for the display apparatus 100' to perform an interaction with a user. For example, the user interface 180 may include at least one from among a touch sensor, a motion sensor, a button, a jog dial, a switch, a microphone, or a speaker, but is not limited thereto.

The communication interface 190 may input and output data of various types. For example, the communication interface 190 may transmit and receive data of various types with the external device (e.g., source device), an external storage medium (e.g., a USB memory), or an external server (e.g., WEBHARD) through communication methods such as, for example, and without limitation, an AP based Wi-Fi (e.g., Wi-Fi, wireless LAN network), Bluetooth, ZigBee, a wired/wireless local area network (LAN), a wide area network (WAN), Ethernet, IEEE 1394, a high-definition multimedia interface (HDMI), a universal serial bus (USB), a mobile high-definition link (MHL), Audio Engineering Society/European Broadcasting Union (AES/EBU), Optical, Coaxial, or the like.

According to an example, the communication interface 190 may include a Bluetooth low energy (BLE) module. The BLE may refer to Bluetooth technology capable of transmitting and receiving low-power and low-capacity data in a 2.4 GHz frequency bandwidth having a reach radius of approximately 10 m. However, the disclosure is not limited thereto, and the communication interface 190 may include a Wi-Fi communication module. That is, the communication interface 190 may include at least one from among the BLE module or the Wi-Fi communication module.

The memory 195 may store data necessary for the various embodiments. The memory 195 may be implemented in the form of a memory embedded in the display apparatus 100' according to a data storage use, or in the form of a memory attachable to or detachable from the display apparatus 100'. For example, the data for the driving of the display apparatus 100' may be stored in the memory embedded in the display apparatus 100', and data for an expansion function of the display apparatus 100' may be stored in a memory attachable to or detachable from the display apparatus 100'.

The memory embedded in the display apparatus 100' may be implemented as at least one from among a volatile memory (e.g., a dynamic random access memory (DRAM), a static RAM (SRAM), a synchronous dynamic RAM (SDRAM) etc.), or a non-volatile memory (e.g., one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive (HDD) or a solid state drive (SSD)). In addition, the memory attachable to or detachable from the display apparatus 100' may be implemented in a form such as, for example, and without limitation, a memory card (e.g., a compact flash (CF), a secure digital (SD), a micro secure digital (micro-SD), a mini secure digital (mini-SD), an extreme digital (xD), a multi-media card (MMC), etc.), an external memory (e.g., universal serial bus (USB) memory) connectable to a USB port, or the like.

According to the example described above, an image may be displayed to different directions respectively using the plurality of optical shutter parts provided in the display apparatus 100'. Accordingly, because it is possible to display the plurality of images even when using the transparent display panel including the signal light emitting layer, and economic feasibility may be secured and user satisfaction may be improved.

Methods according to the various embodiments of the disclosure described above may be implemented in an application form installable in an electronic apparatus of the related art. Alternatively, methods according to the various embodiments of the disclosure described above may be performed using a deep learning-based trained neural network (or deep trained neural network), that is, a learning network model. In addition, the methods according to the various embodiments of the disclosure described above may be implemented with only a software upgrade, or a hardware upgrade for the electronic apparatus of the related art. In addition, the various embodiments of the disclosure described above may be performed through an embedded server provided in the electronic apparatus, or an external server of the electronic apparatus.

According to an embodiment of the disclosure, the various embodiments described above may be implemented with software including instructions stored in a machine-readable storage media (e.g., computer). The machine may call an instruction stored in the storage medium, and as a device operable according to the called instruction, may include the display apparatus (e.g., display apparatus (A)) according to the above-mentioned embodiments. Based on the instruction being executed by the processor, the processor may directly or using other elements under the control of the processor perform a function corresponding to the instruction. The instruction may include a code generated by a compiler or executed by an interpreter. The machine-readable storage medium may be provided in the form of a non-transitory storage medium. Herein, 'non-transitory' merely means that the storage medium is tangible and does not include a signal, and the term does not differentiate data being semi-permanently stored or being temporarily stored in the storage medium.

In addition, according to an embodiment, a method according to the various embodiments described above may be provided included a computer program product. The computer program product may be exchanged between a seller and a purchaser as a commodity. The computer program product may be distributed in the form of a machine-readable storage medium (e.g., a compact disc read only memory (CD-ROM)), or distributed online through an application store (e.g., PLAYSTORE™). In the case of online distribution, at least a portion of the computer program product may be stored at least temporarily in the storage medium such as a server of a manufacturer, a server of an application store, or a memory of a relay server, or temporarily provided.

In addition, each of the elements (e.g., a module or a program) according to the various embodiments described above may be formed as a single entity or a plurality of entities, and some sub-elements of the above-mentioned sub-elements may be omitted, or other sub-elements may be further included in the various embodiments. Alternatively or additionally, some elements (e.g., modules or programs) may be integrated into one entity to perform the same or similar function performed by the respective elements prior to integration. Operations performed by a module, a program, or another element, in accordance with various embodiments, may be executed sequentially, in a parallel, repetitively, or in a heuristic manner, or at least some operations may be executed in a different order, omitted or a different operation may be added.

While the above has been illustrated and described with reference to certain example embodiments thereof, it will be understood that the disclosure is intended to be illustrative, not limiting. It will be understood by those skilled in the art that various changes in form and details may be made therein without departing from the true spirit and full scope of the disclosure, including the appended claims and their equivalents.

What is claimed is:

1. A display apparatus comprising:
   a transparent display panel comprising a plurality of pixel devices, wherein each pixel device of the plurality of pixel devices comprises a plurality of sub pixels and an aperture;
   a first optical shutter part provided at a first side of the plurality of pixel devices and a second optical shutter part provided at a second side of the plurality of pixel devices opposite from the first side;
   a plurality of third optical shutter parts, wherein each third optical shutter part of the plurality of third optical shutter parts corresponds to the aperture of a pixel device of the plurality of pixel devices;
   memory storing one or more instructions; and
   at least one processor configured to execute the one or more instructions,
   wherein the one or more instructions, when executed by the at least one processor individually or collectively, cause the display apparatus to:

control the transparent display panel to alternately display a first image and a second image at a pre-set output frequency, control the first optical shutter part and the second optical shutter part to be in an open state or a closed state based on the pre-set output frequency, control the second optical shutter part to be in the closed state while the first optical shutter part is in the open state, control the second optical shutter part to be in the open state while the first optical shutter part is in the closed state, and based on at least one of the first optical shutter part and the second optical shutter part being in the open state, control the plurality of third optical shutter parts to be in the closed state.

2. The display apparatus of claim 1, wherein the one or more instructions, when executed by the at least one processor individually or collectively, further cause the display apparatus to:

control the first optical shutter part and the second optical shutter part to be open or closed at a frequency two times greater than the pre-set output frequency.

3. The display apparatus of claim 1, further comprising:

a plurality of first optical shutter parts including the first optical shutter part; and a plurality of second optical shutter parts including the second optical shutter part, wherein each respective first optical shutter part of the plurality of first optical shutter parts comprises a first optical shutter corresponding to the plurality of sub pixels of the respective first optical shutter part, and wherein each respective second optical shutter part of the plurality of first optical shutter parts comprises a second optical shutter corresponding to the plurality of sub pixels of the respective second optical shutter part.

4. The display apparatus of claim 1, wherein the one or more instructions, when executed by the at least one processor individually or collectively, further cause the display apparatus to, based on the display apparatus being driven in a unidirectional display mode:

control the transparent display panel to display one image in a first direction corresponding to one of the first side and the second side, and control the open or close state of the first optical shutter part and the second optical shutter part for an optical shutter part disposed at an opposite direction from the first direction to be in the close state and an optical shutter part disposed at a same direction as the first direction to be in the open state from among the first optical shutter part and the second optical shutter part.

5. The display apparatus of claim 4, further comprising:

a user interface; and a sensor, wherein the one or more instructions, when executed by the at least one processor individually or collectively, further cause the display apparatus to:

identify the first direction based on at least one from among a user command received through the user interface or a user position identified through the sensor.

6. The display apparatus of claim 1, wherein the first optical shutter part and the second optical shutter part comprise reflective optical shutters configured to reflect light, wherein the first optical shutter part is configured to reflect light incident to the first optical shutter part while in the closed state, and wherein the second optical shutter part is configured to reflect light incident to the second optical shutter part while in the closed state.

7. The display apparatus of claim 1, wherein the transparent display panel further comprises a plurality of transparent electrodes corresponding to the plurality of pixel devices, and wherein the plurality of transparent electrodes cover at least part of either the first side or the second side of the plurality of sub pixels of each pixel device of the plurality of pixel devices.

8. The display apparatus of claim 1, wherein the transparent display panel further comprises a plurality of opaque electrodes corresponding to the plurality of pixel devices, and wherein the plurality of opaque electrodes cover at least part of either the first side or the second side of the plurality of sub pixels of each pixel device of the plurality of pixel devices.

9. The display apparatus of claim 1, wherein the transparent display panel further comprises:

a transparent substrate disposed at one side of the first optical shutter part; and a scattering layer disposed at a front surface of the transparent substrate and the second optical shutter part, respectively.

10. A method of controlling a display apparatus, the method comprising:

controlling a transparent display panel of the display apparatus to alternately display a first image and a second image at a pre-set output frequency, wherein the transparent display panel comprises a plurality of pixel devices, and each pixel device of the plurality of pixel devices comprises a plurality of sub pixels and an aperture;

controlling a first optical shutter part of the display apparatus and a second optical shutter part of the display apparatus to be in an open state or a closed state based on the pre-set output frequency, wherein the first optical shutter part is provided at a first side of the plurality of pixel devices, and the second optical shutter part is provided at a second side of the plurality of pixel devices opposite from the first side;

controlling the second optical shutter part to be in the closed state while the first optical shutter part is in the open state;

controlling the second optical shutter part to be in the open state while the first optical shutter part is in the closed state; and based on at least one of the first optical shutter part and the second optical shutter part being in the open state, controlling a plurality of third optical shutter parts of the display apparatus to be in the closed state, wherein each third optical shutter part of the plurality of third optical shutter parts corresponds to the aperture of a pixel device of the plurality of pixel devices.

11. The method of claim 10, further comprising:

controlling the first optical shutter part and the second optical shutter part to be open and closed at a frequency two times greater than the pre-set output frequency.

12. The method of claim 10, wherein the display apparatus comprises a plurality of first optical shutter parts including the first optical shutter part and a plurality of second optical shutter parts including the second optical shutter part,
- wherein each respective first optical shutter part of the plurality of first optical shutter parts comprises a first optical shutter corresponding to the plurality of sub pixels of the respective first optical shutter part, and
- wherein each respective second optical shutter part of the plurality of first optical shutter parts comprises a second optical shutter corresponding to the plurality of sub pixels of the respective second optical shutter part.

13. The method of claim 10, further comprising:
based on the display apparatus being driven in a unidirectional display mode:
- controlling the transparent display panel to display one image in a first direction corresponding to one of the first side and the second side; and
- controlling the open or close state of the first optical shutter part and the second optical shutter part for an optical shutter part disposed at an opposite direction from the first direction to be in the close state and an optical shutter part disposed at a same direction as the first direction to be in the open state from among the first optical shutter part and the second optical shutter part.

14. The method of claim 13, further comprising:
identifying the first direction based on at least one from among a user command received through a user interface of the display apparatus or a user position identified through a sensor of the display apparatus.

15. A non-transitory computer readable medium having instructions stored therein, which when executed by at least one processor cause the at least one processor to execute a method of controlling a display apparatus, the method comprising:
- controlling a transparent display panel of the display apparatus to alternately display a first image and a second image at a pre-set output frequency, wherein the transparent display panel comprises a plurality of pixel devices, and each pixel device of the plurality of pixel devices comprises a plurality of sub pixels and an aperture;
- controlling a first optical shutter part of the display apparatus and a second optical shutter part of the display apparatus to be in an open state or a closed state based on the pre-set output frequency, wherein the first optical shutter part is provided at a first side of the plurality of pixel devices, and the second optical shutter part is provided at a second side of the plurality of pixel devices opposite from the first side;
- controlling the second optical shutter part to be in the closed state while the first optical shutter part is in the open state;
- controlling the second optical shutter part to be in the open state while the first optical shutter part is in the closed state; and
- based on at least one of the first optical shutter part and the second optical shutter part being in the open state, controlling a plurality of third optical shutter parts of the display apparatus to be in the closed state,
- wherein each third optical shutter part of the plurality of third optical shutter parts corresponds to the aperture of a pixel device of the plurality of pixel devices.

16. The non-transitory computer readable medium of claim 15, wherein the display apparatus comprises a plurality of first optical shutter parts including the first optical shutter part and a plurality of second optical shutter parts including the second optical shutter part.

17. The non-transitory computer readable medium of claim 15, wherein the method further comprises,
based on the display apparatus being driven in a unidirectional display mode:
- controlling the transparent display panel to display one image in a first direction corresponding to one of the first side and the second side; and
- controlling the open or close state of the first optical shutter part and the second optical shutter part for an optical shutter part disposed at an opposite direction from the first direction to be in the close state and an optical shutter part disposed at a same direction as the first direction to be in the open state from among the first optical shutter part and the second optical shutter part.

18. The non-transitory computer readable medium of claim 17, wherein the method further comprises:
identifying the first direction based on at least one from among a user command received through a user interface of the display apparatus or a user position identified through a sensor of the display apparatus.

\* \* \* \* \*